United States Patent Office 3,296,248
Patented Jan. 3, 1967

3,296,248
PROCESS OF OXIDATIVE AGING OF
HYDROXYETHYLCELLULOSE
Reid Logan Mitchell, Morristown, N.J., assignor to Rayonier Incorporated, Shelton, Wash., a corporation of Delaware
No Drawing. Filed Apr. 19, 1962, Ser. No. 188,835
4 Claims. (Cl. 260—232)

This invention relates to the oxidative-aging of hydroxyethylcellulose (HEC), and has for its object the provision of an improved process for rapidly and controllably effecting such aging by means of catalytic amounts of cobalt or manganese.

It has been the practice heretofore in the preparation of HEC to subject alkali cellulose to oxidative-aging to control the degree of polymerization (D.P.) to provide solutions of suitable viscosity for spinning filaments or casting films. The most commonly used method for doing this has been to age the alkali cellulose itself for long periods of time ranging from many hours to several days prior to ethoxylation. Other proposed methods have included batch aging of the ethoxylated product, raising the temperature of the aging process on alkali cellulose using excess oxygen on alkali cellulose and various combinations of the foregoing. Each method, however, has had its limitations and drawbacks, particularly when applied to continuous methods for preparing HEC where flexibility of control, speed of reaction and uniformity are at a premium. By means of the process of the present invention, we have been able to obtain a more uniformly aged product of any desired D.P. in a matter of minutes rather than hours or days.

This invention is based on the discovery that HEC, the product resulting from ethoxylation of an alkali cellulose, can be aged much more uniformly and quickly than alkali cellulose itself and under better control to give the desired D.P. by performing continuously at least a major portion of the aging at an elevated temperature in the presence of an excess of oxygen and with the catalytic effect of a small quantity of a cobalt or manganese compound.

In essence, I have discovered an accelerated, post-reaction aging sequence applicable to HEC which produces a suitable depolymerized product in shorter time having a higher degree of quality and uniformity than previously attainable.

I have discovered that the reacted HEC product is far more susceptible to the application of the combination of accelerant conditions used in this invention than ordinary alkali cellulose prior to reaction with ethylene oxide. This is contrary to what one finds in the viscose process where aging is more effective when carried out prior to forming the reacted product (cellulose xanthate). It is also contrary to what is generally experienced in HEC processes in which the use of higher temperatures during aging of alkali cellulose leads to lower quality, poorer uniformity and lower filterability in the resultant product. I attribute these unexpected effects on quality to some unknown but beneficial effect of the aging catalyst on the reacted rather than on the unreacted material. Perhaps it is due to enhanced accessibility of the material following insertion of the substituent group. I was surprised at the remarkable improvements achieved in using the catalysts in post-reaction depolymerization of the HEC as compared with use of the same catalysts on the materials in pre-reaction aging.

In practicing the process of the invention, a suitable compound of cobalt or manganese or mixtures thereof is added to the cellulose subsequently to be used for preparation of the HEC, preferably as a water-soluble compound, and the amount of cobalt or manganese herein mentioned refers to the contained elemental cobalt or manganese and not to the compound. Advantageously, the cobalt may be provided as a salt such as cobaltous sulfate, nitrate or chloride, and the manganese may be provided as manganous sulfate, chloride, nitrate, acetate or potassium permanganate. The compound is used in such amount that from 0.2 to 3 p.p.m. of elemental cobalt or from 1 to 25 p.p.m. of elemental manganese is present in the HEC at the time it is to be depolymerized, based on the weight of the dry HEC content. Preferably it is added to the cellulose pulp prior to steeping.

An alkali cellulosic material containing a catalyst that is either unaged or only very slightly aged (as in shredding) is ethoxylated in the usual manner, i.e., by the addition of the proper amount of ethylene oxide. The resulting HEC, while still in the form of an alkaline crumb or sheet or in "diced" condition, is led in a continuous operation into an atmosphere containing oxygen, while containing a minute amount of added cobalt or manganese catalyst, at a temperature of 30 to 60° C. Depending upon the D.P. (as measured by the viscosity) that is desired in the final product, the oxygen concentration can range from about 0.2 to 2.0 atmospheres. The oxidation may be carried out in air, oxygen enriched air, or in commercial oxygen. By this means the required aging time can easily be reduced from say 24 hours to as low as 10 minutes without deleterious effect on the product. The value of this reduction in shortening processing time is particularly important in that it makes possible a practical continuous process.

The production of HEC is generally well known and may be carried out in any suitable manner. The operation may be controlled both as to the steeping with sodium hydroxide and the etherification with ethylene oxide to form a product having the desired solubility characteristics as described more fully in the Mitchell et al. Patent 2,847,411. As a specific objective, the operation may be carried out to effect uniform alkalization on high alpha cellulose pulp of the type having relatively uniform chain lengths and the treatment of the alkalized cellulose with ethylene oxide so as to substitute on the cellulose from about 2% to about 8% of ethylene oxide and form HEC which is substantially all soluble in a 5% aqueous sodium hydroxide solution at about 0° C. but which is substantially insoluble in water. A product of this character has the important feature of being washable with water to remove excess caustic and by-products without appreciably dissolving and wasting HEC.

The following examples illustrate the catalyzed oxidative-aging of HEC produced from high alpha cellulose from wood pulp.

*Example I*

High alpha cellulose in the form of a continuous sheet of wood pulp having a 750 D.P. level was treated to contain 2 p.p.m. cobalt based on the weight of the pulp. This catalyzed pulp was steeped in a continuous operation by forcing 9 to 19% sodium hydroxide through the moving sheet at equilibrium with respect to leached-out cobalt and at a temperature of 50° C. The resultant alkali cellulose sheet was shredded continuously on exit from the steeping operation and fed directly into a reaction chamber where it was continuously reacted with ethylene oxide to a substitution level of 4%. This reacted product was fed continuously from the reactor to a continuous aging tower through which it was led in an atmosphere containing 20% oxygen at atmospheric pressure at a temperature of 50° C. Retention time of 50 minutes gave a product on exit from the aging process that had the desired D.P. of 300. When converted into a solution containing 8% cellulose and 7% sodium hydroxide the material gave a filterability of 500 plugging value and it was cast to yield films with gel swelling of about 600% which were tough and with no trace of sliminess. Finished film in 1 mil thickness containing 18% glycerol had an impact resistance of 8.0 and flex life of 120.

Material prepared from uncatalyzed similar pulp in this same equipment but pre-aged in the alkali cellulose state rather than post-aged as reacted HEC at a customary temperature of 30° C. required 48 hours aging time, yielded solutions that filtered at a level of only 150 plugging value, had a higher gel swelling (undesirable) at 800%, and yielded finished film of 1 mil thickness containing 18% glycerol that tested only 4.5 on impact and 75 on flex life.

*Example II*

Another high alpha cellulose pulp of 800 D.P. was treated with 12 p.p.m. manganese then steeped, reacted and aged in a manner similar to the pulp in Example I. It required 2 hours at 50° C. to age in air (20% oxygen) and yielded a solution filtering at a level of 450 plugging value. When flushed and aged in pure oxygen at 50° C. the aging requirement was reduced to 60 minutes. When commercial oxygen was used under pressure at 1.6 atmospheres at 50° C. the aging requirement was reduced to 40 minutes.

The following table lists the results of the catalytic oxidative-aging of reacted product made in sequences similar to Examples I and II.

The following are definitions of terms used in the foregoing specification:

The "gel swelling" value of a cellulose material is a measure of its ability to hold water under certain specified conditions, and is expressed either as the ratio of centrifuged (750G for 2 minutes) wet weight to dry weight×100 in the case of films or as the ratio of the difference between the centrifuged wet weight and dry weight to the dry weight×100 in the case of fibrous materials. It is desirable to have low swelling values.

"Plugging value" is a numerical rating of the filterability of a solution determined as the weight of solution passed through one square cm. of filter cloth area before the cloth becomes completely plugged. The weight of solution required to plug the filter medium is determined by plotting the filtration rate at successive intervals against the "total weight filtered" and extrapolating the plotted data to zero rate. High values are desirable.

"Impact resistance" is the film resistance to rupture by the swing of a weighted pendulum expressed as the energy expended in breaking the film in kilogram-centimeters. It is the difference between the initial potential energy of the pendulum and the final potential energy of the pendulum after the break. The higher the value the tougher the film.

"Flex life" is the capacity of film to resist the development of a threshold break while being subjected to a flexing stress. It is determined by the accordion-like flexing of a cylindrical film sample under slight air pressure until a pinhole is developed in the film as shown by AGING REQUIREMENT TO OBTAIN 35 b.f.s. SOLUTIONS (HIGH ALPHA CELLULOSE STEEPED IN 18.5% NaOH)

| Temperature, °C. (React., Age) | Catalyst Conc. | Oxygen Pressure (Atm.) | Aging Requirement (Hours) | Plugging Value of Subsequent Solution |
|---|---|---|---|---|
| Pre-reaction, 30° C | None | 0.2 (air) | 48 | 150 |
| Post-reaction, 30° C | do | do | 24 | 250 |
| Post-reaction, 50° C | do | do | 3.25 | 275 |
| Do | do | 1.6 (oxygen) | 1 | 250 |
| Do | 10 p.p.m. Mn | 0.2 (air) | 1¾ | 400 |
| Do | do | 1.6 (oxygen) | ¾ | 420 |
| Post-reaction, 40° C | 2 p.p.m. Mn | 0.2 (air) | 3 | 450 |
| Do | do | 1.6 (oxygen) | 1 | 425 |
| Post-reaction, 50° C | 2 p.p.m. Co | 0.2 (air) | 50 min | 500 |
| Do | do | 1.6 (oxygen) | 25 min | 500 |
| Post-reaction, 60° C | do | 0.2 (air) | 20 min | 475 |
| Do | do | 1.6 (oxygen) | 10 min | 450 |

Although an oxygen content higher than that in air (approximately 20%) is beneficial in speeding up the aging or depolymerization of HEC when using cobalt or manganese catalysts, the foregoing results show that an even greater beneficial effect is obtained by deferring aging until after "ethoxylation" has taken place. In such a case, an elevated temperature can be used to further speed up the aging process without the harmful effect it has on filterability, etc., when applied to the alkali cellulose before it is ethoxylated. The catalyzed post-ethoxylative aging process of the present invention not only speeds up the aging process in a controllable manner but also improves the filterability and other properties of the resultant HEC as well.

Ability to use higher than normal amounts of oxygen without damage is important not so much to gain extra shortening of the aging time itself, but to provide sufficient oxygen in the oxygen-consuming aging process, and hence prevent "oxygen starvation" in the heavily catalyzed high temperature reactions which can shorten the aging time to a matter of a few minutes. While very short periods are practical if enriched air or oxygen is provided and heat is carried away, I consider the preferred period to be one of roughly ½ to 2 hours for a continuous operation because of the greater economies in using a process that does not require excess oxygen and excess heat removal.

a drop in air pressure. A high value reflects good durability.

"Viscosity in ball fall seconds (b.f.s.)" is the time in seconds required for a steel ball ⅛ inch in diameter to fall 20 centimeters through the solution at 20° C. temperature and may be converted to centipoises by multiplying by 148. A high viscosity reflects short aging and high degree of polymerization.

I claim:

1. In the production of hydroxyethylcellulose in which cellulose is converted to alkali cellulose and reacted with ethylene oxide to form hydroxyethylcellulose having from 2% to 8% of substituted ethylene oxide, the improvement in aging the hydroxyethylcellulose to lower the D.P. which comprises subjecting the hydroxyethylcellulose to oxidative aging from about 10 minutes to 24 hours at a temperature of from 30° to 60° C. in an oxygen-containing gas and in contact with a water soluble salt of a metal of the group consisting of cobalt and manganese in an amount sufficient to provide from 0.2 to 3 p.p.m. of cobalt and 1 to 25 p.p.m. of manganese based on the bone dry weight of the hydroxyethylcellulose.

2. In the process of claim 1 incorporating the salt catalyst in the cellulose prior to reacting with ethylene oxide to form the hydroxyethylcellulose.

3. In the process of claim 1 incorporating the salt catalyst in the cellulose prior to forming alkali cellulose and lowering the D.P. to about 300.

4. In the process of claim 1, using commercial oxygen.

References Cited by the Examiner

UNITED STATES PATENTS

| | | | |
|---|---|---|---|
| 2,512,338 | 6/1950 | Klug et al. | 260—231 |
| 2,682,536 | 6/1954 | Mitchell | 260—233 |
| 2,841,579 | 7/1958 | Villefroy et al. | 260—231 |
| 2,847,411 | 8/1958 | Mitchell et al. | 260—231 |

LEON J. BERCOVITZ, *Primary Examiner.*

ABRAHAM H. WINKELSTEIN, *Examiner.*

R. S. AULL, R. W. MULCAHY, *Assistant Examiners.*